Aug. 19, 1941.　　　P. DUREPAIRE　　　2,252,803
JET DIGGER SUCTION HEAD
Filed June 29, 1938　　2 Sheets-Sheet 1
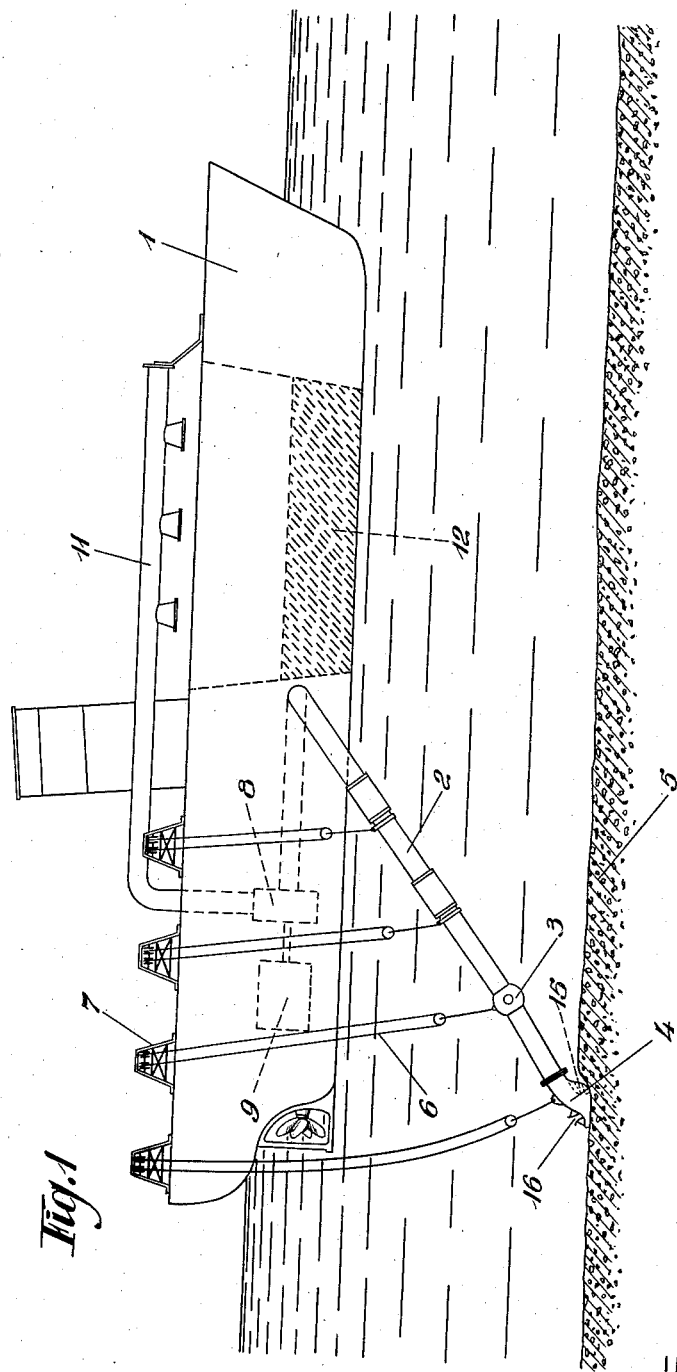
INVENTOR
PIERRE DUREPAIRE
By Young, Emery + Thompson
ATTYS.

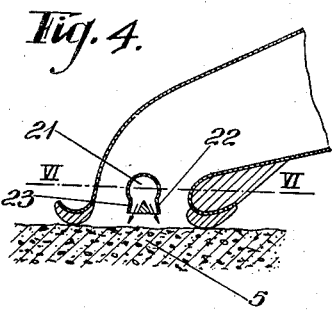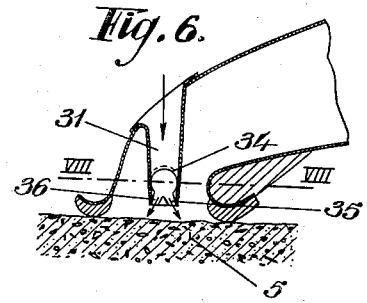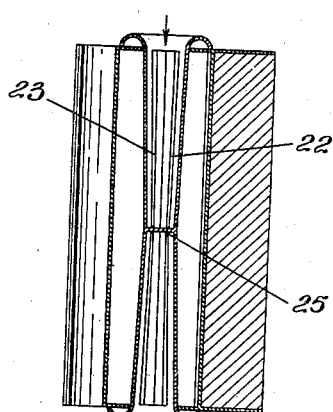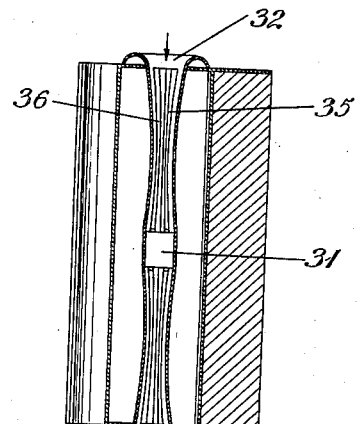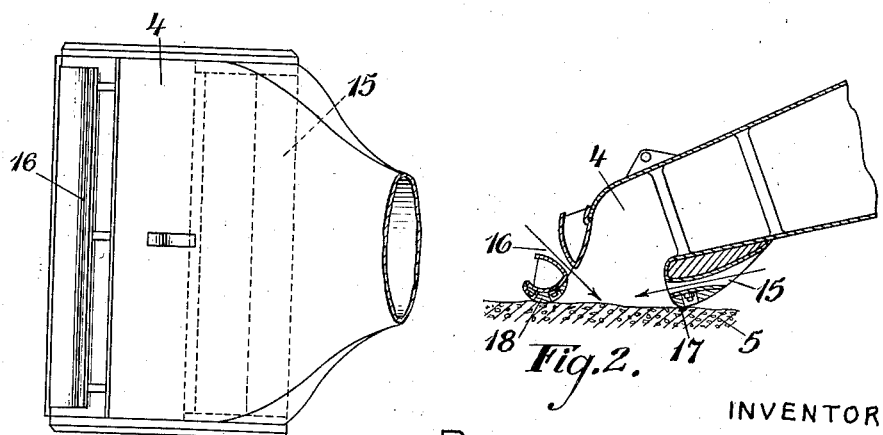

Patented Aug. 19, 1941

2,252,803

UNITED STATES PATENT OFFICE 2,252,803

JET DIGGER SUCTION HEAD

Pierre Durepaire, Nantes, France

Application June 29, 1938, Serial No. 216,628
In France August 2, 1937

1 Claim. (Cl. 37—63)

For dredging by the suction method, as carried on by suction dredgers operating in the anchored position or in travel, the efficiency of the work, i. e. the proportion of loose earth in the mixture withdrawn, will depend, other factors being equal, upon the permeability of the ground under treatment.

This is due to the fact that for permeable ground, and on condition that suitable forms are given to the suction pipes, the streams of liquid which serve for the formation of the mixture will flow, for the greater part, through the interstices between the particles of the ground, thus facilitating the suspension of such particles, in conjunction with the action of the streams of liquid which flow over the surface of the ground.

When the ground is hardly permeable, the case is different. If the orifice of the beak, the part situated at the end of the suction pipe, is applied very tightly upon the ground, the vacuum produced by the pump will increase, and as air locks are then formed, the output becomes quite insufficient.

On the contrary, if the application of the beak upon the ground is not sufficiently tight, the pump will only take up water containing a small amount of solid substances.

It is of great advantage to increase the concentration of the mixture by reducing the diluting water to a minimum, as the object is to discharge the maximum volume of earth in the minimum time.

In order to facilitate the dredging of ground which is hardly permeable, it has been already proposed to give the beak of the dredging pipe a hook-shaped curved form, in order to scrape the ground and to take up the parts of the ground as the dredger moves forward, dragging with it the dredging pipe.

As a rule, this method is not satisfactory, as it often causes the clogging of the earth pump, since the parts removed from the ground are not sufficiently diluted. Moreover, the irregular condition of the ground gives rise to abnormal resistances which bring an excessive strain upon the dredging pipe, and when meeting with a wreck or a hard piece of ground, this may cause a serious accident.

Trials have been made with claws in the form of plowshares, which are placed around the beak of the dredging pipe. But this device increases the force required of the propellers of the dredger, or of the lifting winches, and moreover, it has but little practical value. Again, it is in danger of catching upon a piece of wreck or upon hard ground.

Use has also been made of revolving knife-blades, actuated by a suitable transmission, which dig up the ground in front of the beak. However, the control of such blades gives rise to a great mechanical complication, it requires a great power, and is practically put out of use in the case of agitated water.

The present invention relates to a device of a very simple construction which obviates the drawbacks found in the known apparatus, and provides for the dredging of more or less impermeable ground, while affording a great degree of concentration.

According to the invention, the beak of the dredging pipe is traversed by convergent nozzles which are directed towards the surface of the ground and whose outlets are situated quite near this surface.

By the effect of the vacuum in the dredging pipe and the beak, the water will enter through these nozzles; here it gradually reaches a high speed, and is then projected upon the ground which it strikes without any appreciable reduction of speed, hence disagregating the ground, and the parts thus detached can be drawn off.

The accompanying drawings, which are given solely by way of example, show various embodiments of the invention.

Fig. 1 is an elevational view showing a dredger in which the dredging pipe is fitted according to the invention.

Figs. 2 and 3 represent the beak of the dredging pipe on a larger scale, Fig. 2 being a vertical section, and Fig. 3 a plan view.

Figs. 4 and 5 represent another constructional form of the beak. Fig. 4 is a vertical section, and Fig. 5 a plan view with a section on the line VI—VI of Fig. 4.

Figs. 6 and 7 are analogous views relating to a modification. Fig. 6 is a vertical section of the beak, and Fig. 7 is a section on the line VIII—VIII of Fig. 6.

The dredger I which is represented in Fig. 1 comprises, in the known manner, a dredging pipe 2 provided with a ball joint 3 and terminated by a beak 4 resting upon the bottom 5, the said pipe and the beak being suspended by cables 6 from supports 7 mounted on the deck of the dredger.

A pump 8, driven by a motor 9, withdraws a mixture of water and loose earth, and discharges it through a conduit into a chamber 12 adapted to receive such earth.

Earth pumps can now be constructed which will operate without air locks and with a suction vacuum of the order of 7 meters at least.

However, the manometric height necessary to provide for the discharge of the mixture from the beak of the dredging pipe to the inlet of the pump may be reduced to some 3 meters.

The present invention utilizes the difference, or about 4 meters, for producing an injection of water in the beak of the dredging pipe which disaggregates the earth and places it in suspension in the water.

For this purpose, the said beak is traversed by convergent nozzles which cause, by the action of the partial vacuum, the intake of the water, its rapid flow, and the formation of currents which are directed upon the ground covered by the beak of the dredging pipe.

In the embodiment shown in Figs. 1, 2 and 3, the said beak is provided with such nozzles at 15 on the front side and at 16 on the rear side.

As shown in Fig. 2, the said nozzles have a flaring form towards the exterior, and they produce strong streams of water, as shown by the arrows in this figure. In this way, the surface layers of the ground are well stirred up, and the detached parts are drawn off by the water.

The inlet section of the nozzles is calculated in such way that the entering speed of the water will not be excessive, and that there will be no risk of drawing in substances which might clog up or damage the nozzles. The section of the neck of the convergent nozzle is calculated in order to correspond to the flow of the diluting water which is required, at the speed which is chosen within the limits of the manometric height available for the suction of the pump.

As the orifice of the beak is in contact with the ground at 17 and 18, this will afford tight working conditions upon the whole periphery of the dredging pipe.

In the device represented in Figs. 1, 2 and 3, it is supposed that the convergent injection nozzles are provided only on the front and rear faces of the beak, but similar nozzles might be provided upon the side faces.

Moreover, each of the elongated nozzles herein represented may be replaced by a set of juxtaposed nozzles.

The beak of the dredging pipe may be constructed as shown in Figs. 4 and 5.

A tube 21 is mounted in the transverse position, and it is pierced with slots communicating with convergent nozzles 22 and 23 which are directed towards the surface of the ground.

The tube 21 has preferably a flaring form towards the exterior, as shown in Fig. 5. It may also be divided at its middle part by a wall 25 which is shown in the same figure.

It may also be divided in the longitudinal direction, and each chamber thus formed will supply a nozzle or a set of nozzles.

For large outputs, it may be desirable that the water shall enter the tube 21 not only at its ends, but also at the middle part. This is represented in Figs. 6 and 7. A vertical intake channel is now provided at 31, and the water is supplied both by this channel and by the lateral ends 32 and 33 of the transverse tube 34. Nozzles 35 and 36 produce streams which are directed towards the ground.

The water might enter the tube 34 simply through the channel 31, and in this case the ends 32 and 33 of the tube 34 will be closed by partitions.

The invention is further applicable to the case in which the orifice of the beak is turned towards the front.

It should be understood that the preceding examples are given solely by way of explanation, and that the invention covers all suction pipes provided with nozzles receiving water from the exterior, then causing its rapid flow by the effect of the vacuum produced by a suction pump, and projecting this water upon the ground to be dredged.

On the other hand, the said invention is not limited to suction dredgers, but is further applicable to all devices adapted for the suction of solid substances in suspension in a liquid.

The apparatus according to the invention is of a most effective nature. In all cases, it improves the work by greatly increasing the concentration of the mixture withdrawn, and it provides for the dredging of ground which is hardly permeable and which could not be worked in proper conditions with known types of beaks for dredging pipes.

Moreover, the said apparatus has the advantage of a great simplicity and an inexpensive construction, as it does not require the use of an additional machine, and can be very readily applied to the known dredgers by simply changing the beak of the dredging pipe.

I claim:

In a device of the character described, a dredger suction pipe, a beak at the end of said pipe, a plurality of slot-like parallel nozzles extending transversely of the beak disposed with their discharge openings inside the beak and directed towards the plane of the mouth of the beak, said nozzles being inclined at an acute angle to the axis of the beak, a horizontal feed conduit for said nozzles coextensive therewith and having intake openings at each end communicating with water outside the beak and a duct extending upwardly from the central portion of said conduit and opening through the upper part of the beak for feeding water to the center of said conduit intermediate its ends.

PIERRE DUREPAIRE.